Feb. 7, 1967  R. H. GAPP  3,302,510
DIE-DRAW BLIND RIVET WITH NON-DEFORMING DIE
Filed Nov. 27, 1964  2 Sheets-Sheet 2
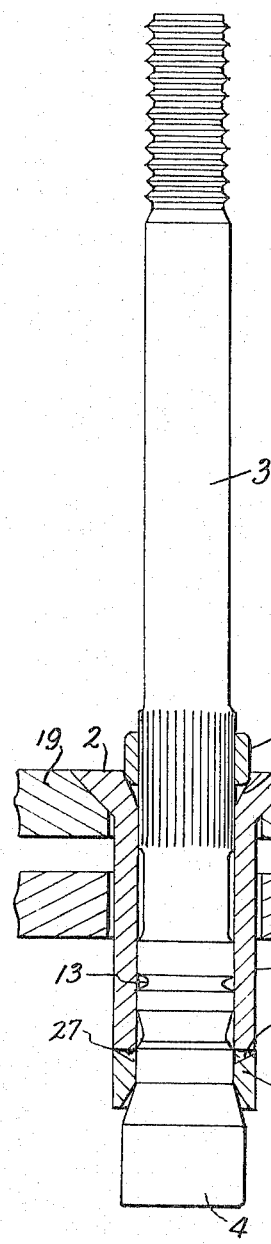
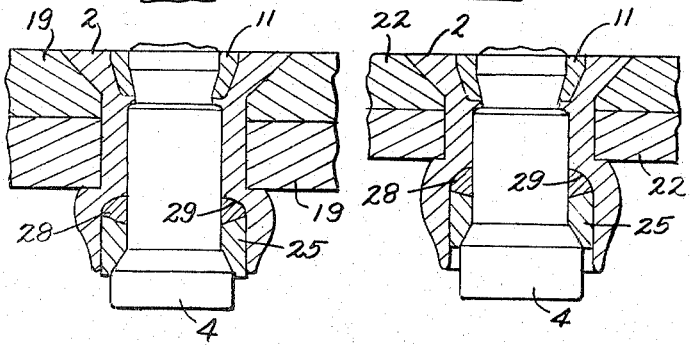
INVENTOR.
ROLAND H. GAPP
BY George B White
ATTORNEY.

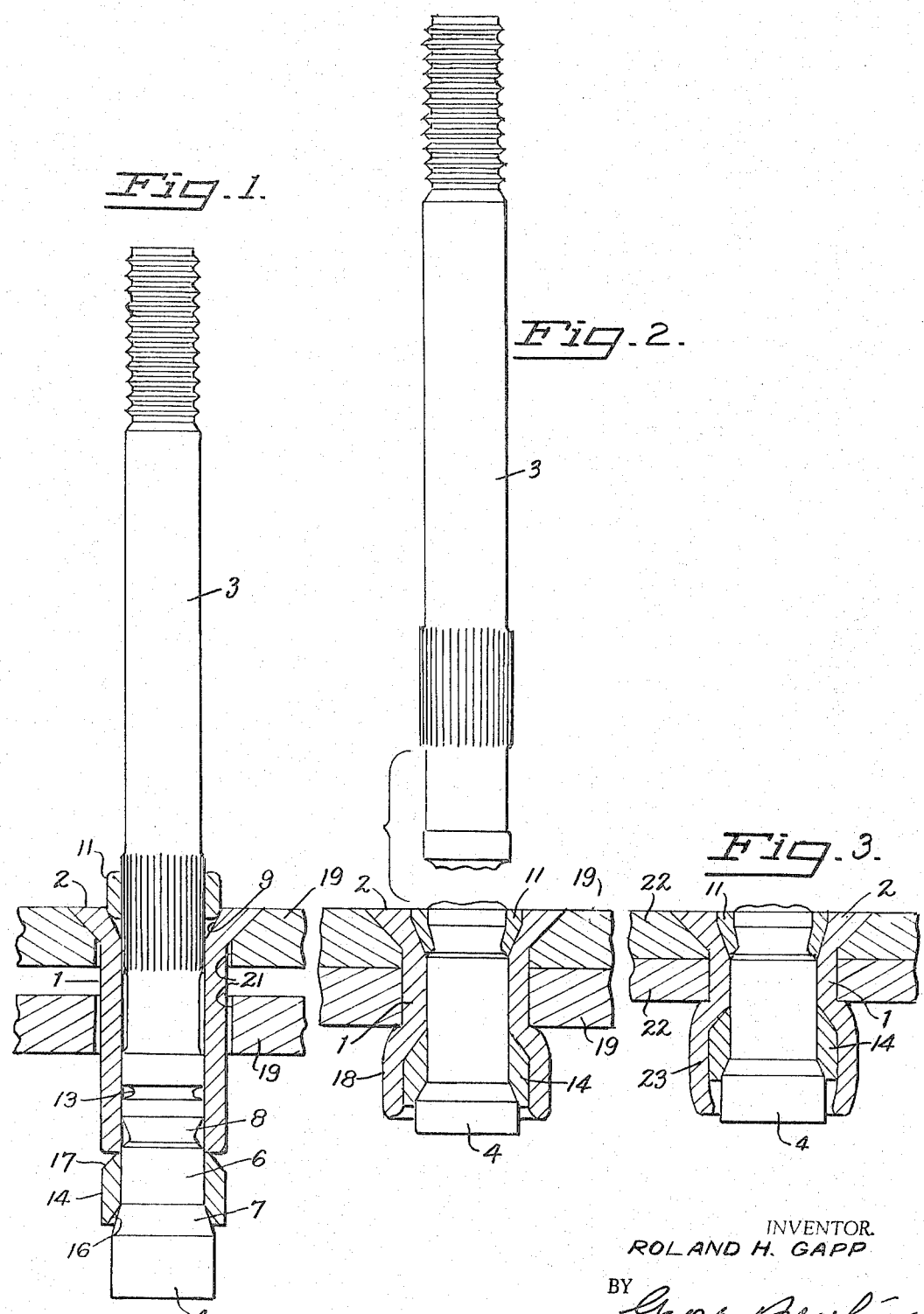

United States Patent Office 3,302,510
Patented Feb. 7, 1967

3,302,510
DIE-DRAW BLIND RIVET WITH
NON-DEFORMING DIE
Roland H. Gapp, Santa Ana, Calif., assignor to Textron Industries, Inc., a corporation of Delaware
Filed Nov. 27, 1964, Ser. No. 414,317
4 Claims. (Cl. 85—77)

In general, this invention relates to the type of blind rivets wherein the stem is pulled through a tubular rivet so as to form a blind head on the blind side of the work by pulling a former head into the blind end of the tubular rivet.

The primary object of the invention is to provide a method and rivet assembly wherein the blind head is formed by a non-deforming die acting on the blind end of the rivet shank, so that after the blind head is formed, the stem is forced to wire-draw through the non-deforming die for a suitable distance to locate a locking portion or groove in the proper position relatively to the head of the rivet there to be engaged by a suitable lock, and then upon further pull the stem will fracture at a substantially predetermined position relatively to the exposed face of the work; the distance through which the stem will wire-draw in the die depending on the thickness of the material of the work in which the rivet is installed; for instance, in a thick grip the stem will wire-draw farther than in a thin grip, thus giving to the rivet the ability to perform over an almost unlimited range of grips.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional view of a rivet assembly inserted in the work in an initial position.

FIG. 2 is a partly sectional view of the assembled rivet in the work at the time the stem is fractured.

FIG. 3 is a partly sectional view of the assembled rivet in a work of thinner grip than the work in FIG. 2.

FIG. 4 is a partly sectional view showing the rivet assembly in the initial position in the work with a wiredrawing die in a different form than the wiredrawing die in the embodiment of FIG. 1.

FIG. 5 is a partly sectional view showing the rivet with the modified drawing die assembled in the work, and FIG. 6 is a partly sectional view showing the rivet with the modified drawing die assembled in a thinner work.

The rivet assembly includes a tubular rivet shank 1 with a rivet head 2 at one end. A stem 3 extends through the shank 1 and the head 2. The stem 3 has on its tail end a blind former head 4 which is connected to a cylindrical portion 6 of the stem 3 by a frusto-conical connecting entrance portion 7. A locking groove 8 is provided adjacent the cylindrical portion 6.

The object is to wiredraw the cylindrical former head 4 of the stem 3 so as to locate the locking groove 8 in the vicinity of and substantially within the rivet head 2. The rivet head 2 has a recess 9 around the stem 3 into which can be driven a locking collar 11 so as to be swaged into the locking groove 8 as shown in FIGS. 2 and 3.

A break-neck 13 is provided on the stem 3 spaced above the locking groove 8, being of such strength that after the locking collar 11 is swaged in place, then further pull of the stem 3 will cause the fracture of the stem 3 at said break-neck groove 13.

The herein improvement on this type of rivet is the provision of a hardened steel die 14 which is substantially non-deformable under the usual tensions applied in the setting of such rivets. The substantially non-deforming die 14 is generally cylindrical and in its initial position surrounds the cylindrical portion 6 of the stem 3 and has a frustro-conical recess 16 surrounding the frusto-conical connecting portion 7 substantially as shown in FIG. 1. The tapering angle of the recess 16 is somewhat larger than the corresponding angle of connecting portion 7 so as to be initially spaced therefrom and thus provides a measure of control over the load to wiredraw the stem. In the forms shown in FIGS. 1, 2 and 3, the upper end of the die has an exterior frusto-conical entering end 17 in engagement with the tail of the rivet shank 1.

The usual rivet setting tool such as the type described in United States Patent 3,038,626 of Walter R. Simmons, issued on June 12, 1962, is applied to hold the rivet head 2 in place and then pull the stem 3 for setting the rivet. Thus the substantially non-deforming die 14 is pulled into the tail of the rivet shank 1 so as to expand the tail end into the tulip or blind head 18 so as to clinch the plates 19 together as shown in FIG. 2. The rivet shank 1 is sufficiently ductile relatively to the stem 3 and die 14 to be expanded into the tulip or blind head 18 by the die 14. After the tail end of the rivet is so upset by the die 14 and the blind head 18 is formed tightly against the blind side of the sheet 19, then resistance to further movement of the die 14 relatively to the rivet shank 1 and relatively to the sheet 19 becomes greater than the pull required to wiredraw the cylindrical former head 4 through the die 14. The die 14 has sufficient hardness to resist appreciable expansion as the former head 4 is wiredrawn through it. The former head 4 will continue to wiredraw until the locking groove 8 reaches the correct position to receive the locking collar 11, then the locking collar 11 is driven into the locking groove 8. Further tensile load applied to the stem 3 will fracture the stem 3 at the break-neck groove 13 because the pull required to continue wiredrawing plus the force required to overcome the resistance of the locked collar 11, is greater than the breaking strength of the break-neck groove 13.

The inside diameter of the die 14 determines the diameter to which the stem will wiredraw. For instance, if the inside diameter of the die 14 is larger than the inside diameter of the rivet shank 1, the wiredrawn portion of the stem will cause the rivet shank 1 to expand and fill the hole 21 in the sheets 19. If hole fill is not desired, then the inside diameter of die 14 will be substantially the same as the initial inside diameter of rivet shank 1.

As shown in FIG. 3, when the sheets 22 are thinner so as to require shorter grip, then the connecting portion 7 and the former head 4 are wiredrawn less than in the comparatively thicker grip shown in FIG. 2. This results in a longer blind head 23 with the die 14 being concealed deeper within the blind head 23, than in the thicker grip of FIG. 2. The actual wiredrawing occurs by drawing the connecting portion 7 into and through the inner diameter of the die 14 and thus reducing the corresponding portions of the diameter of the former 4. The diameter of the former 4, therefore, is always larger than the inner diameter of the die 14. The inter-related hardness and ductility of the stem, the die and the rivet shank control the tension load required for the wiredrawing.

In the modified form shown in FIGS. 4, 5 and 6 the elements of the rivet assembly are substantially the same as in the form heretofore described. The die 25 in this form has a dished top formed by a recess 26 in the top of the die 25 which provides a cylindrical cutting edge 27. As the tail of the rivet shank is collapsed and expanded radially outwardly, the shearing edge 27 in entering within the enlarged tail of the rivet shank 1 shears a small ring of material from the inner peripheral portion of the enlarged tail, forcing it ahead of the die so as to compress the sheared ring of material 28 against the inside shoulder 29 of the enlarged tail so as to result in further expansion of the tail near the blind side of the work as shown in FIGS. 5 and 6. The difference between FIGS. 5 and 6 is that the grip in FIG. 6 is shorter or thinner than the grip in FIG. 5.

In general, the stems in these rivets wiredraw in a die of fixed dimension under fixed conditions, and will result in consistency of performance. The rivet application shown in FIGS. 4 to 6 is believed to be the first practical rivet that permits formation of a large tulip type blind head followed by clinching the sheets together, prior to filling of the hole in the sheets being riveted. The degree of hole fill can be readily controlled by pre-determining the inner diameter of the die. The degree of clamp-up of these rivets can be controlled by the angle of the top of the die, the hardness and other factors affecting wiredrawability of the portion of the stem which wiredraws through the die. The ability to control the hole fill and clamp-up consistently, together or independently, is of critical importance particularly in riveting fragile plastic or thin sandwich constructions, and the degree of control so exercised by the herein method and rivet is unique.

The following materials produced satisfactory results as to relative ductility in carrying out the herein invention: shank 1 made of annealed A286 having tensile strength of 100,000 p.s.i.; tool steel die 14, having tensile strength of approximately 350,000 p.s.i.; and former head 4 made of age hardened A286 having approximately 200,000 p.s.i. tensile strength.

I claim:
1. A rivet assembly for tightly securing sheets together, said rivet assembly including,
   (a) a tubular rivet shank fitting into aligned holes in the sheets,
   (b) a rivet head on one end of said rivet shank,
   (c) a tail on the other end of said rivet shank,
   (d) a stem extending through said tubular rivet tail, shank and head,
   (e) a pulling portion of said stem extending beyond said rivet head and being slidable through said rivet,
   (f) a cylindrical portion on said stem adjacent the rivet tail,
   (g) an elongated and radially enlarged blind head on the blind end of said stem,
   (h) a joining portion connecting said blind head to said cylindrical portion, said joining portion being tapered converging from the diameter of said blind head to the diameter of said cylindrical portion,
   (i) the improvement of a substantially non-deformable die surrounding said cylindrical portion between said joining portion and said rivet tail,
   (j) said die having a tapered socket in the end thereof adjacent to and bearing on said tapered joining portion,
   (k) the relative hardness and ductility of the stem, the die and the rivet shank being such that when the rivet is set the non-deforming die is pulled into the rivet tail and expands the tail against the adjacent sheet and then clinches the sheets together and then resists further pull into said rivet tail whereby continued pull of the stem wiredraws said joining portion and said enlarged blind head through said die and into said rivet shank and rivet head,
   (l) means to interlock said rivet head and stem in said wiredrawn position.

2. The rivet assembly defined in claim 1, and
   (m) a tapered entering portion formed on the end of the die adjacent said shank tail converging substantially to the end of the inner periphery of said shank tail for entering said shank tail when the stem is pulled, thereby to expand said shank tail against the adjacent sheet.

3. The rivet assembly defined in claim 1, and
   (m) said die having in its other end adjacent said shank tail a generally frusto-conical recess forming a shearing edge at the outer periphery of said die whereby when said die is pulled against said shank tail it expands the tail and the shearing edge shears material along the inner periphery of said tail and compacts the sheared material against the inner portion of the enlarged shank tail.

4. In the method of setting a blind rivet assembly having a rivet shank with a rivet head on one end thereof and a pulling stem extended through said shank and head, an enlarged former on the end of the stem adjacent the tail of the rivet shank, a tapered connecting portion connecting said former to the stem, the steps of
   (a) providing a die, non-deformable relatively to said rivet shank and said stem, around said stem at the tail of the rivet shank,
   (b) inserting the rivet assembly through holes in the work,
   (c) enlarging said tail of the rivet shank into a blind head against the adjacent side of the work and clinching said work by pulling said stem while holding the rivet head against the other side of the work, thereby pulling said die into said tail and shearing material from the inner periphery of said shank and compacting the sheared material ahead of said die, until the blind head so formed is pressed against the work and the work is tightly clinched,
   (d) continuing the pulling of the stem thereby wiredrawing the tapered connecting portion and the enlarged former through said die to a selected distance.

References Cited by the Examiner

UNITED STATES PATENTS

| 2,372,222 | 3/1945 | Mullgardt | 85—72 |
| 2,536,353 | 1/1951 | Cooper | 85—77 |

FOREIGN PATENTS

| 1,254,584 | 1/1961 | France. |
| 436,238 | 10/1935 | Great Britain. |
| 472,329 | 9/1937 | Great Britain. |
| 625,331 | 6/1949 | Great Britain. |

CARL W. TOMLIN, *Primary Examiner.*

M. PARSONS, JR., *Assistant Examiner.*